(12) United States Patent
Klein et al.

(10) Patent No.: US 7,012,043 B2
(45) Date of Patent: Mar. 14, 2006

(54) DRILLING FLUIDS

(75) Inventors: Howard P. Klein, Austin, TX (US); Chris E. Godinich, Houston, TX (US)

(73) Assignee: Huntsman Petrochemical Corporation, The Woodlands, TX (US)

( * ) Notice: Subject to any disclaimer, the term of this patent is extended or adjusted under 35 U.S.C. 154(b) by 337 days.

(21) Appl. No.: 10/289,643

(22) Filed: Nov. 7, 2002

(65) Prior Publication Data

US 2003/0148892 A1 Aug. 7, 2003

Related U.S. Application Data

(60) Provisional application No. 60/337,538, filed on Nov. 8, 2001.

(51) Int. Cl.
*C09K 7/02* (2006.01)

(52) U.S. Cl. ............... 507/133; 507/130; 564/504; 564/505; 540/466

(58) Field of Classification Search ............... 507/133, 507/246, 130; 564/504, 505; 540/466
See application file for complete search history.

(56) References Cited

U.S. PATENT DOCUMENTS

| | | | | |
|---|---|---|---|---|
| 5,028,343 | A * | 7/1991 | Lindstrom | 507/244 |
| 6,247,543 | B1 * | 6/2001 | Patel et al. | 175/64 |
| 6,331,508 | B1 * | 12/2001 | Pakulski | 507/90 |
| 6,339,048 | B1 * | 1/2002 | Santhanam et al. | 507/131 |
| 6,484,821 | B1 * | 11/2002 | Patel et al. | 175/64 |
| 6,609,578 | B1 * | 8/2003 | Patel et al. | 175/64 |
| 6,756,345 | B1 * | 6/2004 | Pakulski et al. | 507/246 |
| 2003/0155157 | A1 * | 8/2003 | Patel et al. | 175/64 |

* cited by examiner

*Primary Examiner*—Philip C. Tucker
(74) *Attorney, Agent, or Firm*—Nicole Graham

(57) ABSTRACT

Drilling fluid additives that act to control clay swelling in drilled formations without adversely effecting the properties of the drilling fluid. The drilling fluid additives preferably comprise a polyether amine, a polyether amine derivative, or mixtures thereof. Drilling fluids that comprise such drilling fluid additives and a method of reducing clay swelling in drilled formations are also disclosed.

15 Claims, No Drawings

DRILLING FLUIDS

CROSS REFERENCE TO RELATED APPLICATIONS

This application claims priority to U.S. Provisional Application Ser. No. 60/337,538, which was filed on Nov. 8, 2001.

TECHNICAL FIELD

This invention relates to drilling fluids, and, more particularly, to drilling fluids comprising a polyether amine, a polyether amine derivative, or blends thereof.

BACKGROUND OF THE INVENTION

A drilling fluid used in the rotary drilling of subterranean wells is expected to perform many functions. For example, the drilling fluid needs to carry cuttings from beneath the drill bit up the annulus, thereby allowing their separation at the surface. At the same time, the drilling fluid is also expected to cool and clean the drill bit, reduce friction between the drill string and the sides of the hole, and maintain stability in the bore hole's uncased sections. The drilling fluid is also expected to form a filter that seals openings in the formations penetrated by the bit so as to reduce the unwanted influx of formation fluids from permeable rocks. In addition, in drilling subterranean wells, formation solids often become dispersed in the drilling fluid. These formation solids typically comprise the cuttings produced by the drill bit's action and the solids produced by the bore hole's instability. The presence of either type of formation solids in the drilling fluid can greatly increase drilling time and costs, especially if the formation solids are clay minerals that swell. The overall increase in bulk volume accompanying clay swelling impedes removal of cuttings from beneath the drill bit, increases friction between the drill string and the sides of the bore hole, inhibits formation of the thin filter that seals formations, and causes loss of circulation or stuck pipe. Accordingly, another function of the drilling fluid is to reduce the adverse effects of formation solids, particularly clay minerals that swell.

The clay minerals that are encountered in the drilling of subterranean wells are generally crystalline in nature, with a flaky, mica-type structure. The "flakes" of the clay are made up of a number of crystal platelets stacked face-to-face. Each platelet is called a unit layer, and the surfaces of the unit layer are called basal surfaces. A unit layer is composed of multiple sheets. One type of sheet, the octahedral sheet, is composed of either aluminum or magnesium atoms octahedrally coordinated with the oxygen atoms of hydroxyls. Another type of sheet, the tetrahedral sheet, consists of silicon atoms tetrahedrally coordinated with oxygen atoms. Sheets within a unit layer link together by sharing oxygen atoms. When this linking occurs between one octahedral and one tetrahedral sheet, one basal surface consists of exposed oxygen atoms while the other basal surface has exposed hydroxyls. Alternatively, two tetrahedral sheets may bond with one octahedral sheet by sharing oxygen atoms. The resulting structure, known as the Hoffman structure, has an octahedral sheet that is sandwiched between the two tetrahedral sheets. As a result, both basal surfaces in a Hoffman structure are composed of exposed oxygen atoms. The individual unit layers of the clay are stacked together face-to-face, and are held in place by weak attractive forces. The distance between corresponding planes in adjacent unit layers is called the c-spacing.

In clay mineral crystals, atoms having different valences commonly will be positioned within the sheets of the structure to create a negative potential at the crystal surface. When the clay crystal is suspended in water, a cation may be adsorbed on the surface, and these absorbed cations, often called exchangeable cations, may chemically trade places with other cations. In addition, ions may also be adsorbed on the clay crystal edges and exchange with other ions in the water.

The type of substitutions occurring within the clay crystal structure and the exchangeable cations adsorbed on the crystal surface greatly affect clay swelling. Clay swelling is a phenomenon in which water molecules surround a clay crystal structure and position themselves to increase the structure's c-spacing, which causes an increase in the volume of the clay. Two types of swelling may occur, either surface hydration or osmotic. Only certain clays, such as sodium montmorillonite, exhibit osmotic swelling, whereas all clays exhibit surface hydration swelling.

Surface hydration swelling involves the hydrogen bonding of water molecules to the oxygen atoms exposed on the crystal surface, which results in layers of water molecules aligning to form a quasi-crystalline structure between the unit, thereby increasing the c-spacing. In osmotic swelling, if the concentration of cations between unit layers in a clay mineral is higher than the cation concentration in the surrounding water, water will be osmotically drawn between the unit layers, thereby increasing the c-spacing. Osmotic swelling typically causes the clay to swell more than surface hydration.

Exchangeable cations found in clay minerals are reported to have a significant impact on the amount of swelling that takes place. The exchangeable cations compete with water molecules for the available reactive sites in the clay structure. Generally, cations with high valences are more strongly adsorbed than cations with low valences. Thus, clays with low valence exchangeable cations will swell more than clays whose exchangeable cations have high valences.

In the North Sea and the United States Gulf Coast, drillers commonly encounter argillaceous sediments in which the predominant clay mineral is sodium montmorillonite (commonly called "gumbo clay"). Sodium cations are predominately the exchangeable cations in gumbo clay. Because the sodium cation has a low positive valence (+1 valence) it easily disperses into water. Consequently, gumbo clay is notorious for its swelling. Thus, given the frequency in which gumbo clay is encountered in drilling subterranean wells, the development of a substance and method for reducing clay swelling is of primary importance in the drilling industry.

One commonly employed method to reduce clay swelling is the addition of salts to the drilling fluids. However, salts flocculate the clays, which causes both high fluid losses and an almost complete loss of thixotropy. Further, increasing salinity often decreases the functional characteristics of drilling fluid.

Accordingly, there is a long felt need for a drilling fluid additive that acts to control clay swelling in drilled formations without adversely effecting the properties of drilling fluids; a drilling fluid that contains such drilling fluid additive; and a method of reducing clay swelling in a drilled formation. The present invention is directed towards meeting these needs.

SUMMARY OF THE INVENTION

In one embodiment, the present invention is directed towards a drilling fluid for drilling wells through formations containing clay that swells in the presence of water. Preferably, the drilling fluid comprises a weight material, a clay hydration inhibition agent, and an aqueous continuous phase. The clay hydration inhibition agent preferably comprises a polyether amine, a polyether amine derivative, or mixtures thereof. Preferably, the polyether amine contains primary amino groups attached to the terminus of a polyether backbone, and the polyether backbone is based either on propylene oxide (PO), ethylene oxide (EO), or a mixture of EO and PO. Such polyether amines may include, but are not limited to polyether amines with the following general formula:

$$H_2N-X-[OCH_2CH_2]_x-[OCH_2CH(CH_3)]_y-NH_2 \quad (1)$$

where X is a straight or branched chain aliphatic with less than about 5 carbon atoms; x is number from 0 to about 15; and y is a number from 0 to about 15. Such polyether amines derivatives may include, but are not limited to, oligomeric triethyleneglycol diamines with the following average structure:

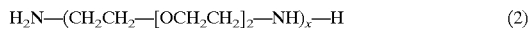

$$H_2N-(CH_2CH_2-[OCH_2CH_2]_2-NH)_x-H \quad (2)$$

where x varies from about 1 to about 4; 4,13-diaza-18-crown-6, hexaethyleneglygol triamine; oligomeric triethyleneglycol diamines with the following general formula:

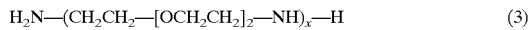

$$H_2N-(CH_2CH_2-[OCH_2CH_2]_2-NH)_x-H \quad (3)$$

where x is an integer from about 2 to about 5; branched polyether diamine derivatives with the following formula:

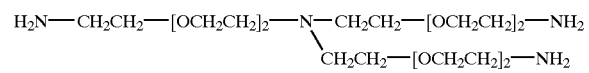

$$H_2N-CH_2CH_2-[OCH_2CH_2]_2-N\begin{matrix}-CH_2CH_2-[OCH_2CH_2]_2-NH_2\\ \diagdown CH_2CH_2-[OCH_2CH_2]_2-NH_2\end{matrix} \quad (4)$$

and mixtures thereof, including, without limitation, Amine C-48, which is commercially available from Huntsman Petrochemical Corporation, Houston, Tex., CAS No. 131324-11-3.

In another embodiment, the present invention is directed towards clay hydration inhibition agents that inhibit the swelling of clay that may be encountered during the drilling of wells. The clay hydration inhibition agents of the present invention comprise a polyether amine, a polyether amine derivative, or mixtures thereof. Preferably, the polyether amine contains primary amino groups attached to the terminus of a polyether backbone, and the polyether backbone is based either on propylene oxide (PO), ethylene oxide (EO), or a mixture of EO and PO. Such polyether amines may include, but are not limited to polyether amines with the following general formula:

$$H_2N-X-[OCH_2CH_2]_x-[OCH_2CH(CH_3)]_y-NH_2 \quad (1)$$

where X is a straight or branched chain aliphatic with less than 5 carbon atoms; x is number from 0 to about 15; and y is a number from 0 to about 15. Such polyether amines derivatives may include, but are not limited to, oligomeric triethyleneglycol diamines with the following average structure:

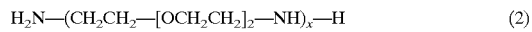

$$H_2N-(CH_2CH_2-[OCH_2CH_2]_2-NH)_x-H \quad (2)$$

where x varies from about 1 to about 4; 4,13-diaza-18-crown-6, hexaethyleneglygol triamine; oligomeric triethyleneglycol diamines with the following general formula:

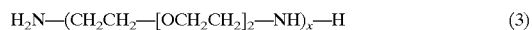

$$H_2N-(CH_2CH_2-[OCH_2CH_2]_2-NH)_x-H \quad (3)$$

where x is an integer from about 2 to about 5; branched polyether diamine derivatives with the following formula:

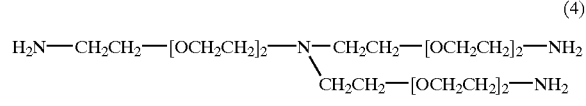

$$H_2N-CH_2CH_2-[OCH_2CH_2]_2-N\begin{matrix}-CH_2CH_2-[OCH_2CH_2]_2-NH_2\\ \diagdown CH_2CH_2-[OCH_2CH_2]_2-NH_2\end{matrix} \quad (4)$$

and mixtures thereof, including, without limitation, Amine C-48, which is commercially available from Huntsman Petrochemical Corporation, Houston, Tex., CAS No. 131324-11-3.

In another embodiment, the present invention includes a method of reducing the swelling of clay in a well, involving circulating in the well a drilling fluid formulated in accordance with the present disclosure. Preferably, the drilling fluid comprises a weight material, a clay hydration inhibition agent, and an aqueous continuous phase.

DETAILED DESCRIPTION

In one embodiment, the present invention is directed towards a drilling fluid for drilling wells through formations containing clay that swells in the presence of water. Preferably, the drilling fluid comprises a weight material, a clay hydration inhibition agent, and an aqueous continuous phase. The drilling fluids of the present invention may also include additional components, such as fluid loss control agents, bridging agents, lubricants, anti-bit balling agents, corrosion inhibition agents, surfactants, suspending agents, and the like which are know to those skilled in the art.

The weight material in the drilling fluids of the present inventions increases the density of the fluid, which helps prevent kick-backs and blow-outs. The amount of weight material in the drilling fluid composition will depend largely on the nature of the formation being drilled. The weight material component of the drilling fluids of the present invention may be generally selected from any type of weighting materials, including, without limitation, solids, those in particulate form, those suspended in solution, those dissolved in the aqueous phase as part of the preparation process, or those added during drilling. It is preferred that the weight material be selected from the group including barite, hematite, iron oxide, calcium carbonate, magnesium carbonate, organic and inorganic salts, and mixtures and combinations of these compounds and similar such weight materials that are commonly used in the art.

The clay hydration inhibition agent component of the drilling fluid of the present invention should be present in sufficient concentration to reduce surface hydration swelling and/or osmotic swelling of the clay. The exact amount of the clay hydration inhibition agent present in a particular drilling fluid formulation can be determined by a trial and error method of testing various combinations of the drilling fluid with the clay formation encountered. Generally, however, the clay hydration inhibition agent of the present invention may be used in drilling fluids in a concentration from about 1 to about 18 pounds per barrel (lbs/bbl or ppb), and, more preferably, in a concentration from about 2 to about 12 pounds per barrel of drilling fluid. Preferably, the clay hydration inhibition agent comprises a polyether amine, a polyether amine derivative, or mixtures thereof. Preferably, the polyether amine contains primary amino groups attached to the terminus of a polyether backbone, and the polyether backbone is based either on propylene oxide (PO), ethylene oxide (EO), or a mixture of EO and PO. Such polyether amines may include, but are not limited to polyether amines with the following general formula:

$$H_2N-X-[OCH_2CH_2]_x-[OCH_2CH(CH_3)]_y-NH_2 \quad (1)$$

where X is a straight or branched chain aliphatic with less than about 5 carbon atoms; x is number from 0 to about 15; and y is a number from 0 to about 15. Such polyether amines derivatives may include, but are not limited to, oligomeric triethyleneglycol diamines with the following average structure:

$$H_2N-(CH_2CH_2-[OCH_2CH_2]_2-NH)_x-H \quad (2)$$

where x varies from about 1 to about 4; 4,13-diaza-18-crown-6, hexaethyleneglygol triamine; oligomeric triethyleneglycol diamines with the following general formula:

$$H_2N-(CH_2CH_2-[OCH_2CH_2]_2-NH)_x-H \quad (3)$$

where x is an integer from about 2 to about 5; branched polyether diamine derivatives with the following formula:

(4)

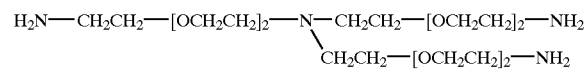

and mixtures thereof, including, without limitation, Amine C-48, which is commercially available from Huntsman Petrochemical Corporation, Houston, Tex., CAS No. 131324-11-3. Amine C-48 is the distillation residue produced in the amination of triethylene glycol to form triethyleneglycol diamine, and typically comprises a blend of triethyleneglycol, triethyleneglycol monoamine, triethyleneglycol diamine, 4,13-diaza- 18-crown-6, hexaethyleneglygol triamine; oligomeric triethyleneglycol diamines with the structure in (3), and branched polyether diamine derivatives with the structure in (4). Amine C-48 typically has a specific gravity of about 1.13, a viscosity (at 25° C.) of about 847 cps, and a total amine content of about 5.231 meg./g. Mixtures of the polyether amines and polyether amine derivatives may include any combination of the polyether amines and polyether amine derivatives disclosed herein. Preferably, the mixture comprises one of the following mixtures:

| Polyether amine component | Polyether amine derivative component |
|---|---|
| A polyether amine of the structure in (1), where X is CH(CH$_3$)CH$_2$; x is 0 and y is 2.6.[1] | Amine C-48 and/or XTJ-512[2] |
| A polyether amine of the structure in (1), where X is CH$_2$CH$_2$; x is 2 and y is 0.[3] | Amine C-48 and/or XTJ-512 |

-continued

| Polyether amine component | Polyether amine derivative component |
|---|---|
| A polyether amine of the structure in (1), where X is CH(CH$_3$)CH$_2$; x is 2 and y is 1.[4] | Amine C-48 and/or XTJ-512 |

[1]Commercially available as JEFFAMINE ® D-230 polyoxypropylene diamine from Huntsman Petrochemical Corporation, Houston, Texas.
[2]XTJ-512 has the structure depicted in (2). It is commercially available from Huntsman Petrochemical Corporation, Houston, Texas.
[3]Commercially available as JEFFAMINE ® EDR-148 triethyleneglycol diamine from Huntsman Petrochemical Corporation, Houston, Texas.
[4]Commercially available as JEFFAMINE ® HK-511 polyoxyalkyleneamine from Huntsman Petrochemical Corporation, Houston, Texas.

Preferably, the mixtures of the polyether amines and polyether amine derivatives contain less than about 50% of the polyether amine derivative component.

The aqueous based continuous phase component of the drilling fluid of the present invention may generally be any water based fluid phase that is suitable for use in a drilling fluid and is compatible with the clay hydration inhibition agents disclosed herein. Preferably, the aqueous based continuous phase is selected from the group comprising fresh water, sea water, brine, mixtures of water and water soluble organic compounds, or mixtures thereof. The amount of the aqueous based continuous phase component in the drilling fluid of the present invention will vary, depending on the drilling application and the nature of the other components in the drilling fluid. Typically, the amount of the aqueous based continuous phase may range from nearly 100% of the drilling fluid to less than 30% of the drilling fluid by volume.

Additionally, an acid maybe added to the drilling fluid compositions of the present invention to neutralize the drilling fluid for handling purposes. Any suitable acid may be used. Preferably, the acid should not form a salt that is not soluble. More preferably, the acid comprises hydrochloric acid. Preferably, the drilling fluid is neutralized to a pH of approximately pH 9.

In addition, the drilling fluids of the present invention may further comprise gelling materials, thinners, and fluid loss control agents. Typical gelling materials used in aqueous based drilling fluids include, but are not limited to, bentonite, sepiolite clay, attapulgite clay, anionic high-molecular weight polymer and biopolymers. Typical thinners include, but are not limited to, lignosulfonates modified lignosulfonates, polyphosphates, tannins, and low molecular weight polyacrylates. Thinners are added to a drilling fluid to reduce flow resistance, control gelation tendencies, reduce filtration and filter cake thickness, counteract the effects of salts, minimize the effects of water on the formations drilled, emulsify the oil in water, and stabilize the mud properties at elevated temperatures. Suitable fluid control agents include, but are not limited to, synthetic organic polymers, biopolymers, and mixtures thereof. The fluid loss control agents may also comprise modified lignite, polymers, and modified starches and celluloses. Ideally, the additives should be selected to have low toxicity and to be compatible with common drilling fluid additives, such as polyanionic carboxymethylcellulose (PAC or CMC), polyacrylates, partially-hydrolyzed polyacrylamides (PHPA), lignosulfonates, xanthan gum, mixtures of these and the like.

The drilling fluids of the present invention may further contain an encapsulating agent. Encapsulating agents help improve the removal of cuttings with less dispersion of the cuttings into the drilling fluids. The encapsulating agents may be anioic, cationic or non-ionic in nature.

Other drilling fluid additives may also be added to the drilling fluids of the present invention, including products such as lubricants, penetration rate enhancers, defoamers, corrosion inhibitors, loss circulation products, and other similar products known to those skilled in the art.

In another embodiment, the present invention is directed towards clay hydration inhibition agents that inhibit the swelling of clay that may be encountered during the drilling of wells. The clay hydration inhibition agents of the present invention comprise a polyether amine, a polyether amine derivative, or mixtures thereof. Preferably, the polyether amine contains primary amino groups attached to the terminus of a polyether backbone, and the polyether backbone is based either on propylene oxide (PO), ethylene oxide (EO), or a mixture of EO and PO. Such polyether amines may include, but are not limited to polyether amines with the following general formula:

$$H_2N-X-[OCH_2CH_2]_x-[OCH_2CH(CH_3)]_y-NH_2 \quad (1)$$

where X is a straight or branched chain aliphatic with less than 5 carbon atoms; x is number from 0 to about 15; and y is a number from 0 to about 15. Such polyether amines derivatives may include, but are not limited to, oligomeric triethyleneglycol diamines with the following average structure:

$$H_2N-(CH_2CH_2-[OCH_2CH_2]_2-NH)_x-H \quad (2)$$

where x varies from about 1 to about 4; 4,13-diaza-18-crown-6, hexaethyleneglygol triamine; oligomeric triethyleneglycol diamines with the following general formula:

$$H_2N-(CH_2CH_2-[OCH_2CH_2]_2-NH)_x-H \quad (3)$$

where x is an integer from about 2 to about 5; branched polyether diamine derivatives with the following formula:

(4)

$$H_2N-CH_2CH_2-[OCH_2CH_2]_2-N{\overset{\displaystyle CH_2CH_2-[OCH_2CH_2]_2-NH_2}{\underset{\displaystyle CH_2CH_2-[OCH_2CH_2]_2-NH_2}{}}}$$

and mixtures thereof, including, without limitation, Amine C-48, which is commercially available from Huntsman Petrochemical Corporation, Houston, Tex., CAS No. 131324-11-3. Amine C-48 is the distillation residue from the manufacture of triethyleneglycol diamine, and typically comprises a blend of triethyleneglycol, triethyleneglocol monoaming, triethyleneglycol diamine, 4,13-diaza-18-crown-6, hexaethyleneglygol triamine; oligomeric triethyleneglycol diamines with the structure in (3), and branched polyether diamine derivatives with the structure in (4). Amine C-48 typically has a specific gravity of about 1.13, a viscosity (at 25° C.) of about 847 cps, and a total amine content of about 5.231 meg./g. Mixtures of the polyether amines and polyether amine derivatives may include any combination of the polyether amines and polyether amine derivatives disclosed herein. Preferably, the mixture comprises one of the following mixtures:

| Polyether amine component | Polyether amine derivative component |
| --- | --- |
| A polyether amine of the structure in (1), where X is CH(CH₃)CH₂; x is 0 and y is 2.6.[1] | Amine C-48 and/or XTJ-512[2] |
| A polyether amine of the structure in (1), where X is CH₂CH₂; x is 2 and y is 0.[3] | Amine C-48 and/or XTJ-512 |
| A polyether amine of the structure in (1), where X is CH(CH₃)CH₂; x is 2 and y is 1.[4] | Amine C-48 and/or XTJ-512 |

[1]Commercially available as JEFFAMINE ® D-230 polyoxypropylene diamine from Huntsman Petrochemical Corporation, Houston, Texas.
[2]XTJ-512 has the structure depicted in (2). It is commercially available from Huntsman Petrochemical Corporation, Houston, Texas.
[3]Commercially available as JEFFAMINE ® EDR-148 triethyleneglycol diamine from Huntsman Petrochemical Corporation, Houston, Texas.
[4]Commercially available as JEFFAMINE ® HK-511 polyoxyalkyleneamine from Huntsman Petrochemical Corporation, Houston, Texas.

Preferably, the mixtures of the polyether amines and polyether amine derivatives contain less than about 50% of the polyether amine derivative component.

Additionally, an acid maybe added to the clay hydration inhibition agents of the present invention to neutralize the clay hydration inhibition agent for handling purposes. Any suitable acid may be used. Preferably, the acid should not form a salt that is not soluble. More preferably, the acid comprises hydrochloric acid. Preferably, the drilling fluid is neutralized to a pH of approximately pH 9.

In another embodiment, the present invention includes a method of reducing the swelling of clay in a well, involving circulating in the well a drilling fluid formulated in accordance with the present disclosure. Preferably, the drilling fluid comprises a weight material, a clay hydration inhibition agent, and an aqueous continuous phase. The drilling fluid may also comprise additional components, such as fluid loss control agents, bridging agents, lubricants, anti-bit balling agents, corrosion inhibition agents, surfactants, suspending agents, and the like which are know to those skilled in the art.

The weight material may be generally selected from any type of weighting materials, including, without limitation, solids, those in particulate form, those suspended in solution, those dissolved in the aqueous phase as part of the preparation process, or those added afterward during drilling. It is preferred that the weight material be selected from the group including barite, hematite, iron oxide, calcium carbonate, magnesium carbonate, organic and inorganic salts, and mixtures and combinations of these compounds and similar such weight materials that are commonly used in the art. The amount of weight material in the drilling fluid composition will depend largely on the nature of the formation being drilled.

The clay hydration inhibition agent should be present in sufficient concentration to reduce surface hydration swelling and/or osmotic swelling of the clay. The exact amount of the clay hydration inhibition agent present in a particular drilling fluid formulation can be determined by a trial and error method of testing the combination of drilling fluid and clay formation encountered. Generally, however, the clay hydration inhibition agent should be present in a concentration from about 1 to about 18 pounds per barrel (lbs/bbl or ppb) and more preferably in a concentration from about 2 to about 12 pounds per barrel of drilling fluid. Preferably, the clay hydration inhibition agent comprises a polyether amine, a polyether amine derivative, or mixtures thereof. Preferably, the polyether amine contains primary amino groups attached to the terminus of a polyether backbone, and the polyether backbone is based either on propylene oxide (PO), ethylene oxide (EO), or a mixture of EO and PO. Such polyether amines may include, but are not limited to polyether amines with the following general formula:

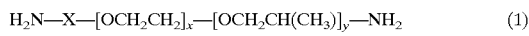

$$H_2N-X-[OCH_2CH_2]_x-[OCH_2CH(CH_3)]_y-NH_2 \quad (1)$$

where X is a straight or branched chain aliphatic with less than about 5 carbon atoms; x is number from 0 to about 15; and y is a number from 0 to about 15. Such polyether amines derivatives may include, but are not limited to, oligomeric triethyleneglycol diamines with the following average structure:

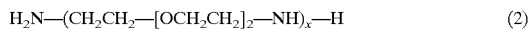

$$H_2N-(CH_2CH_2-[OCH_2CH_2]_2-NH)_x-H \quad (2)$$

where x varies from about 1 to about 4; 4,13-diaza-18-crown-6, hexaethyleneglygol triamine; oligomeric triethyleneglycol diamines with the following general formula:

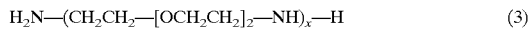

$$H_2N-(CH_2CH_2-[OCH_2CH_2]_2-NH)_x-H \quad (3)$$

where x is an integer from about 2 to about 5; branched polyether diamine derivatives with the following formula:

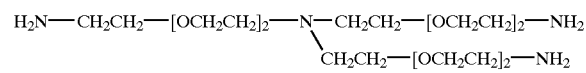

and mixtures thereof, including, without limitation, Amine C-48, which is commercially available from Huntsman Petrochemical Corporation, Houston, Tex., CAS No. 131324-11-3. Amine C-48 is the distillation residue from the manufacture of triethyleneglycol diamine, and typically comprises a blend of triethyleneglycol, triethyleneglocol monoaming, triethyleneglycol diamine, 4,13-diaza-18-crown-6, hexaethyleneglygol triamine; oligomeric triethyleneglycol diamines with the structure in (3), and branched polyether diamine derivatives with the structure in (4). Amine C-48 typically has a specific gravity of about 1.13, a viscosity (at 25° C.) of about 847 cps, and a total amine content of about 5.231 meg./g. Mixtures of the polyether amines and polyether amine derivatives may include any combination of the polyether amines and polyether amine derivatives disclosed herein. Preferably, the mixture comprises one of the following mixtures:

| Polyether amine component | Polyether amine derivative component |
| --- | --- |
| A polyether amine of the structure in (1), where X is CH(CH$_3$)CH$_2$; x is 0 and y is 2.6.[1] | Amine C-48 and/or XTJ-512[2] |
| A polyether amine of the structure in (1), where X is CH$_2$CH$_2$; x is 2 and y is 0.[3] | Amine C-48 and/or XTJ-512 |
| A polyether amine of the structure in (1), where X is CH(CH$_3$)CH$_2$; x is 2 and y is 1.[4] | Amine C-48 and/or XTJ-512 |

[1] Commercially available as JEFFAMINE ® D-230 polyoxypropylene diamine from Huntsman Petrochemical Corporation, Houston, Texas.
[2] XTJ-512 has the structure depicted in (2). It is commercially available from Huntsman Petrochemical Corporation, Houston, Texas.
[3] Commercially available as JEFFAMINE ® EDR-148 triethyleneglycol diamine from Huntsman Petrochemical Corporation, Houston, Texas.
[4] Commercially available as JEFFAMINE ® HK-511 polyoxyalkyleneamine from Huntsman Petrochemical Corporation, Houston, Texas.

Preferably, the mixtures of the polyether amines and polyether amine derivatives contain less than about 50% of the polyether amine derivative component.

The aqueous based continuous may generally be any water based fluid phase that is suitable for use in a drilling fluid and is compatible with the clay hydration inhibition agents disclosed herein. Preferably, the aqueous based continuous phase is selected from the group comprising fresh water, sea water, brine, mixtures of water and water soluble organic compounds, or mixtures thereof. The amount of the aqueous based continuous phase component in the drilling fluid of the present invention will vary, depending on the drilling application and the nature of the other components in the drilling fluid. Typically, the amount of the aqueous based continuous phase may range from nearly 100% of the drilling fluid to less than 30% of the drilling fluid by volume.

Additionally, the drilling fluid composition may further comprise an acid to neutralize the drilling fluid for handling purposes. Any suitable acid may be used. Preferably, the acid should not form a salt that is not soluble. More preferably, the acid comprises hydrochloric acid. Preferably, the drilling fluid is neutralized to a pH of approximately pH 9.

In addition, the drilling fluid may further comprise gelling materials, thinners, and fluid loss control agents. The gelling materials may include, but are not limited to, bentonite, sepiolite clay, attapulgite clay, anionic high-molecular weight polymer and biopolymers. The thinners may include, but are not limited to, lignosulfonates modified lignosulfonates, polyphosphates, tannins, and low molecular weight polyacrylates. The fluid control agents may include, but are not limited to, synthetic organic polymers, biopolymers, and mixtures thereof. The fluid loss control agents may also include modified lignite, polymers, and modified starches and celluloses.

Other drilling fluid additives may also be added to the drilling fluids, including products such as encapsulating agents, lubricants, penetration rate enhancers, defoamers, corrosion inhibitors, loss circulation products, and other similar products know to those skilled in the art.

In addition to the inhibition of clay hydration by the clay hydration inhibition agent, other beneficial properties are likely to be achieved. In particular it is expected that the clay hydration inhibition agents of the present invention are compatible with other drilling fluid components, are tolerant to contaminants, show temperature stability, and exhibit low toxicity. Therefore, it is expected that the clay hydration inhibition agents of the present invention may have broad application both in land based drilling operations, as well as offshore drilling operations.

It is understood that variations may be made in the foregoing without departing from the scope of the invention.

The following example is illustrative of the present invention, and is not intended to limit the scope of the invention in any way. Those of skill in the art should, in light of the present disclosure, appreciate that many changes can be made in the specific embodiments which are disclosed and still obtain a like or similar result without departing from the scope of the invention.

EXAMPLE 1

Prophetic

The clay hydration inhibition agents disclosed herein are tested to confirm their ability to act as clay hydration inhibitors. To determine the foregoing, individual jars are filled with tap water and a sample of a clay hydration inhibition agent of the present invention. The pH of the foregoing mixture is then adjusted to at least a pH of 9 and then is treated with a 50 ppb portion bentonite at a medium shear rate. After stirring for 30 minutes, the rheologies are measured. The samples are then heat aged overnight at 150° F. After the samples are cooled the rheologies and pH of the samples are measured. The resulting measurements show that the clay hydration inhibition agents of the present invention function as clay hydration inhibitors.

Although illustrative embodiments have been shown and described, a wide range of modification, changes, and substitution is contemplated in the foregoing disclosure. In some instances, some features of the disclosed embodiments may be employed without a corresponding use of the other features.

What is claimed is:

1. A drilling fluid for use in drilling wells through a formation containing a clay that swells in the presence of water, the drilling fluid comprising:
   (a) an aqueous based continuous phase;
   (b) a weight material; and
   (c) a clay hydration inhibition agent that comprises: (i) a polyether amine with the following formula:

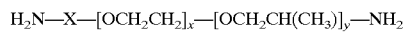

wherein X is a straight or branched chain aliphatic with less than about 5 carbon atoms; x is number greater than 0 to about 15; and y is a number from 0 to about 1, and (ii) a polyetheramine derivative, wherein the polyether amine derivative comprises 4,13-diaza-18-crown-6, hexaethyleneglygol triamine; oligomeric triethyleneglycol diamines with the following general formula:

where x is an integer from about 2 to about 5; and branched polyether diamine derivatives with the following formula:

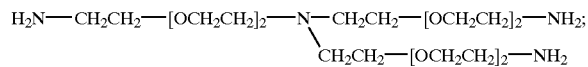

and optionally, an oligomeric triethyleneglycol diamine with the following average structure:

where x varies from about 1 to about 4.

2. The drilling fluid of claim 1, wherein in the polyether amine X is $CH_2CH_2$, x is 2, and y is 0.

3. The drilling fluid of claim 1, wherein in the polyether amine X is $CH(CH_3)CH_2$, x is 2, and y is 1.

4. The drilling fluid of claim 1, wherein the aqueous based continuous phase is selected from the group consisting of fresh water, sea water, brine, mixtures of water and water soluble organic compounds, and mixtures thereof.

5. The drilling fluid of claim 1, wherein the weight material is selected from the group consisting of barite, hematite, iron oxide, calcium carbonate, magnesium carbonate, magnesium organic and inorganic salts, calcium chloride, calcium bromide, magnesium chloride, zinc halides, and combinations thereof.

6. A drilling fluid for use in drilling wells through a formation containing a clay that swells in the presence of water, the drilling fluid comprising:
   (a) an aqueous based continuous phase;
   (b) a weight material; and
   (c) a clay hydration inhibition agent that comprises a mixture of:
   (i) a polyether amine with the following formula:

wherein X is a straight or branched chain aliphatic with less than about 5 carbon atoms; x is number from 0 to about 15; and y is a number from 0 to about 15, and
   (ii) a polyether amine derivative comprising 4,13-diaza-18-crown-6, hexaethyleneglygol triamine; oligomeric triethyleneglycol diamines with the following general formula:

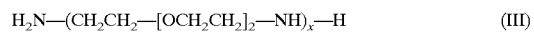

where x is an integer from about 2 to about 5; and branched polyether diamine derivatives with the following formula:

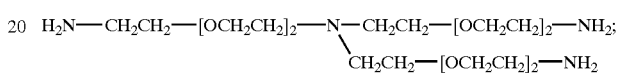

and optionally an oligomeric triethyleneglycol diamine with the following average structure:

where x varies from about 1 to about 4.

7. The drilling fluid of claim 6, wherein X is $CH_2CH_2$, x is 2, and y is 0 in (I).

8. The drilling fluid of claim 6, wherein X is $CH(CH_3)CH_2$, x is 2, and y is 1 in (I).

9. The drilling fluid of claim 6, wherein X is $CH(CH_3)CH_2$, x is 0, and y is 1 in (I).

10. A method of reducing the swelling of clay encountered during the drilling of a subterranean well, the method comprising the step of circulating in the subterranean well a drilling fluid comprising:
    (a) an aqueous based continuous phase;
    (b) a weight material; and
    (c) a clay hydration inhibition agent that comprises: (i) a polyether amine with the following formula:

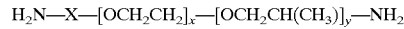

wherein X is a straight or branched chain aliphatic with less than about 5 carbon atoms; x is number greater than 0 to about 15; and y is a number from 0 to about 15, and (ii) a polyether amine derivative, wherein the polyether amine derivative comprises 4,13-diaza-18-crown-6, hexaethyleneglygol triamine; oligomeric triethyleneglycol diamines with the following general formula:

where x is an integer from about 2 to about 5; and branched polyether diamine derivatives with the following formula:

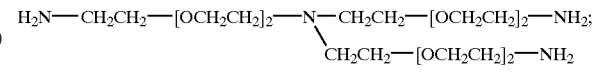

and optionally an oligomeric triethyleneglycol diamine with the following average structure:

where x varies from about 1 to about 4, wherein the clay hydration inhibition agent is present in sufficient concentration to reduce the swelling of the clay.

11. The method of claim 10, wherein in the polyether amine X is $CH_2CH_2$, x is 2, and y is 0.

12. The method of claim 10, wherein in the polyether amine X is $CH(CH_3)CH_2$, x is 2, and y is 1.

13. The method of claim 10, wherein the aqueous based continuous phase is selected from the group consisting of fresh water, sea water, brine, mixtures of water and water soluble organic compounds, and mixtures thereof.

14. The drilling fluid of claim 10, wherein the weight material is selected from the group consisting of barite, hematite, iron oxide, calcium carbonate, magnesium carbonate, magnesium organic and inorganic salts, calcium chloride, calcium bromide, magnesium chloride, zinc halides, and combinations thereof.

15. A clay hydration inhibition agent comprising:
(i) a polyether amine with the following formula:

  (I)

wherein X is a straight or branched chain aliphatic with less than about 5 carbon atoms; x is number from 0 to about 15; and y is a number from 0 to about 15, and (ii) a polyether amine derivative comprising 4,13-diaza-18-crown-6, hexaethyleneglygol triamine; oligomeric triethyleneglycol diamines with the following general formula:

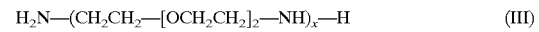  (III)

where x is an integer from about 2 to about 5; and branched polyether diamine derivatives with the following formula:

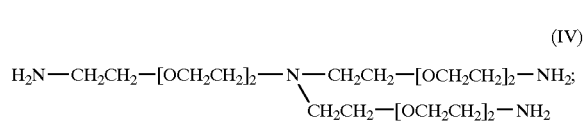  (IV)

and optionally an oligomeric triethyleneglycol diamine with the following average structure:

where x varies from about 1 to about 4.

* * * * *